United States Patent
Poutre' et al.

(10) Patent No.: US 6,957,476 B2
(45) Date of Patent: Oct. 25, 2005

(54) TOOL FOR A KNOCK-ON SWEEP STRUCTURE

(75) Inventors: Benoit Jocelyn Poutre', Elkhart, IA (US); Donald Ray Peck, Clive, IA (US); Mark Donald Beeck, Ankeny, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/651,773

(22) Filed: Aug. 29, 2003

(65) Prior Publication Data

US 2005/0044681 A1    Mar. 3, 2005

(51) Int. Cl.⁷ .............................................. B23P 19/04
(52) U.S. Cl. ...................................................... 29/267
(58) Field of Search ................... 259/25, 131; 29/267, 29/275

(56) References Cited

U.S. PATENT DOCUMENTS 3,061,021 A    10/1962   Shader
6,052,881 A *  4/2000   Vuorinen et al. ............. 29/267
6,289,996 B1   9/2001   Parish
6,585,058 B2   7/2003   Zaun et al.

\* cited by examiner

Primary Examiner—Robert C. Watson (57) ABSTRACT

A sweep removal tool includes a pair of claws with angled surfaces conforming to the top edge of the sweep stem to locate the tool and help distribute sweep removal impact forces. A retainer depressor centered below the claws moves the retainer to a release position and slides between the angled surfaces during sweep removal. The depressor shape assures desired tine contact, even when the sweep is at an extreme position in the range of possible mounted positions, while preventing damaging contact as the depressor moves relative to the retainer during sweep removal. A curved surface extends between the claws and the depressor and facilitates free pivoting of the tine about the claw contact points to depress the retainer. The tool bottoms against the sweep when the depressor is moved to the release position to prevent retained damage from removal impact forces.

19 Claims, 5 Drawing Sheets

TOOL FOR A KNOCK-ON SWEEP STRUCTURE

FIELD OF THE INVENTION

The present invention relates generally to tillage tools and, more specifically, to a tool for removing a knock-on sweep from the end of a shank.

BACKGROUND OF THE INVENTION

Standard assemblies for implements such as chisel plows and field cultivators typically include a spring trip shank assembly extending downwardly to a tool-receiving end which mounts a shovel, point or sweep. Previously available mounting structure included bolts extending through holes in the tool and the shank to secure the tool. When the tool in such an assembly has to be replaced because of wear or damage, the bolts must be removed. Wear and corrosion of the bolts substantially hinders removal and often makes the replacement a difficult and time-consuming task.

Numerous solutions to the problem of easily and quickly replacing worn elements such as sweeps on shanks have been developed over the years, including adapter brackets providing a self-locking fit with a matching taper on knock-on sweeps. Retaining devices have suffered from one or more problems, including need for additional parts and the loss of sweeps when encountering high removal forces during transport and during rebounding of the shank from a tripped position. To reduce incidences of sweeps falling off the shanks in quick mount arrangements, some manufacturers have offered detent mechanisms such as a retaining clip in the form of a sheet metal stamping with a spherical protrusion that fits into a hole in the sweep. To release the sweep, a screwdriver or other tool is used to depress the clip and move the protrusion away from the hole. Other detent arrangements are shown, for example, in U.S. Pat. Nos. 3,061,021; 6,289,996 and 6,585,058.

In the sweep retaining structure shown in the U.S. Pat. No. 6,585,058, a spring wire retainer with a base is supported in a groove on the underside of the wedge support which mates with a stem portion of the sweep. The wedge support is apertured, and a central curved portion of the retainer passes through the aperture and supports a sweep-contacting end above the surface of the wedge support. The end is biased toward a contact area on the sweep to engage the area and eliminate sweep loss problems by preventing the sweep from slipping downwardly from the mounted position. To remove the sweep, a tool is inserted through a slot in the sweep stem. The tool includes a handle with a spring depressor or extension to depress the end of the wire retainer. Transversely spaced ears or claws on the tool position the tool on the top of the sweep stem and help distribute impact forces. A hammer is used to impact a flat surface on the tool to drive the sweep from the assembly.

In co-pending and commonly assigned U.S. patent application Ser. No. 268,581 filed 10 Oct. 2002 and entitled Knock-On Sweep Structure, an improved assembly is shown having a sweep underside which includes two or more spaced retainer end-receiving areas. A wire retainer includes a coil spring and a contact end portion biased against the underside. As the sweep is forced on the adapter on the shank, the contact end springs into retaining position on one of a plurality of stepped portions that aligns with the spring end when the sweep is in the mounted position. The sweep can be attached loosely by hand in an initial position with operating forces moving the sweep to a wedge locked position. The tool shown in the U.S. Pat. No. 6,585,058 is not entirely satisfactory for use with the improved assembly. The claw construction limit accurate and repeatable placement of the tool for optimum stability and interaction with the sweep. Dirt build-up in the sweep opening that receives the extension may have to be removed in a separate operation so that the tool can be properly placed. If the tool is not accurately placed on the sweep stem, the extension may not enter the sweep opening or portions of the tool such as the extension or the claws can actually contact and damage the spring as the sweep is driven off the shank. The extension can transfer damaging forces to the spring as the tool is impacted during sweep removal. Because of the variability of the sweep wedging location and spring end position relative to the mounted sweep, the extension can contact the spring at different locations on the spring. If the depressor contacts the spring at the coil location, retainer depression is difficult or impossible. Under some conditions, the spring can be improperly contacted and deformed by the extension so that sweep retention is compromised.

BRIEF SUMMARY OF THE INVENTION

It is therefore an object of the present invention to provide an improved sweep removal tool that overcomes most or all of the above-mentioned problems. It is another object to provide such an improved tool which is simple to use and inexpensive to manufacture and which facilitates quick and easy removal of the sweep. It is yet another object to provide such a tool having improved retainer depressor alignment and retainer protection.

A sweep removal tool includes a pair of claws with angled surfaces to conform to the top edge of the sweep stem so that surface contact and tool stability are optimized. As a result, impact forces during sweep removal will be distributed more uniformly. The angled surfaces also help to properly align the tool relative to the retainer, even when the retainer access opening in the sweep is packed with dirt, and the step of cleaning out the opening before sweep removal can be eliminated. The shape of the working end of the tool also helps prevent the tool from contacting the retainer spring as the sweep is removed. As the tool and sweep move relative to the adapter during sweep removal, the spring will be guided by and will slide between the angled surfaces. A specially shaped notch on the depressor or compression tine centered below the claws avoids unwanted contact of the retainer at the coil spring. The tine and notch shape assure desired tine contact when the sweep is at an extreme position in the range of possible mounted positions.

The tool includes a curvature feature which facilitates entry through the sweep hole for contact and depression of the retainer. The tool surface which extends between the claws and the tine is curved to avoid contact between the top of the sweep stem and facilitates free pivoting of the tine about the claw contact points to depress the retainer. The tool bottoms against the sweep when the retainer is moved to a release position to prevent impact forces from damaging the retainer.

These and other objects, features and advantages of the present invention will become apparent to one skilled in the art upon reading the following detailed description in view of the drawings.

BRIEF DESCRIPTIONS OF THE INVENTION

DETAILED DESCRIPTION OF THE INVENTION

Figure 2:
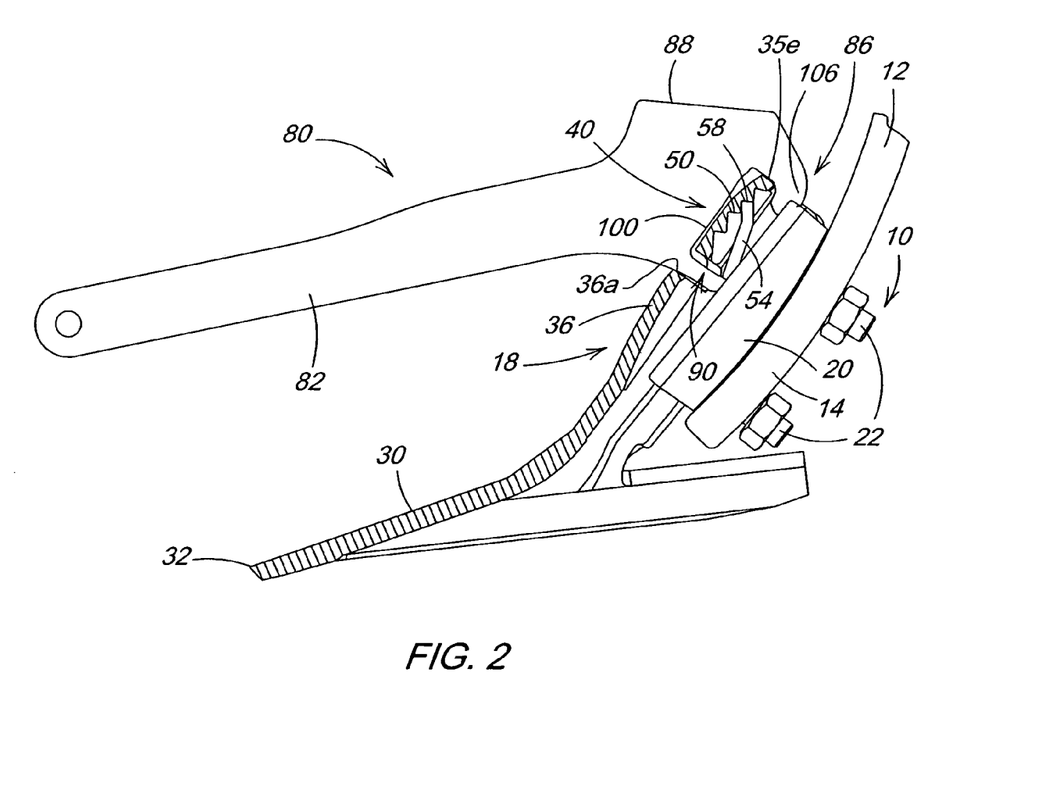
FIG. 2 is a side view, partially in section, showing the sweep removal tool of FIG. 1 and a sweep assembly with the tool positioned to begin depressing a sweep retainer spring prior to removal of the sweep.
Figure 3:
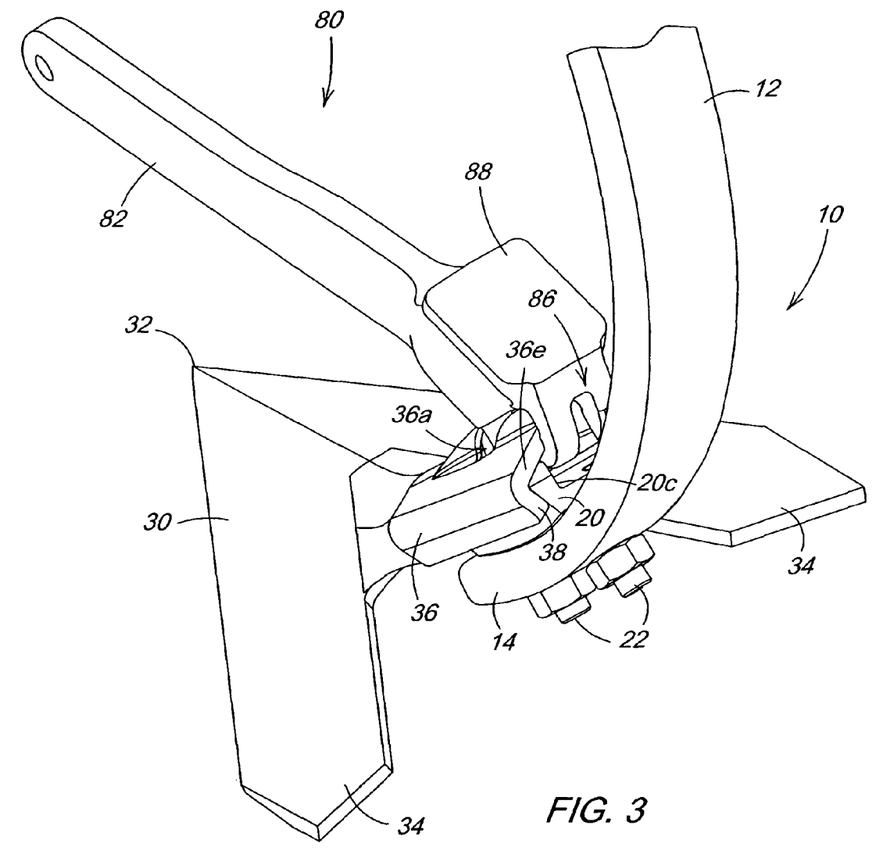
FIG. 3 is a perspective view of the tool and sweep assembly of FIG. 2.
Figure 4:
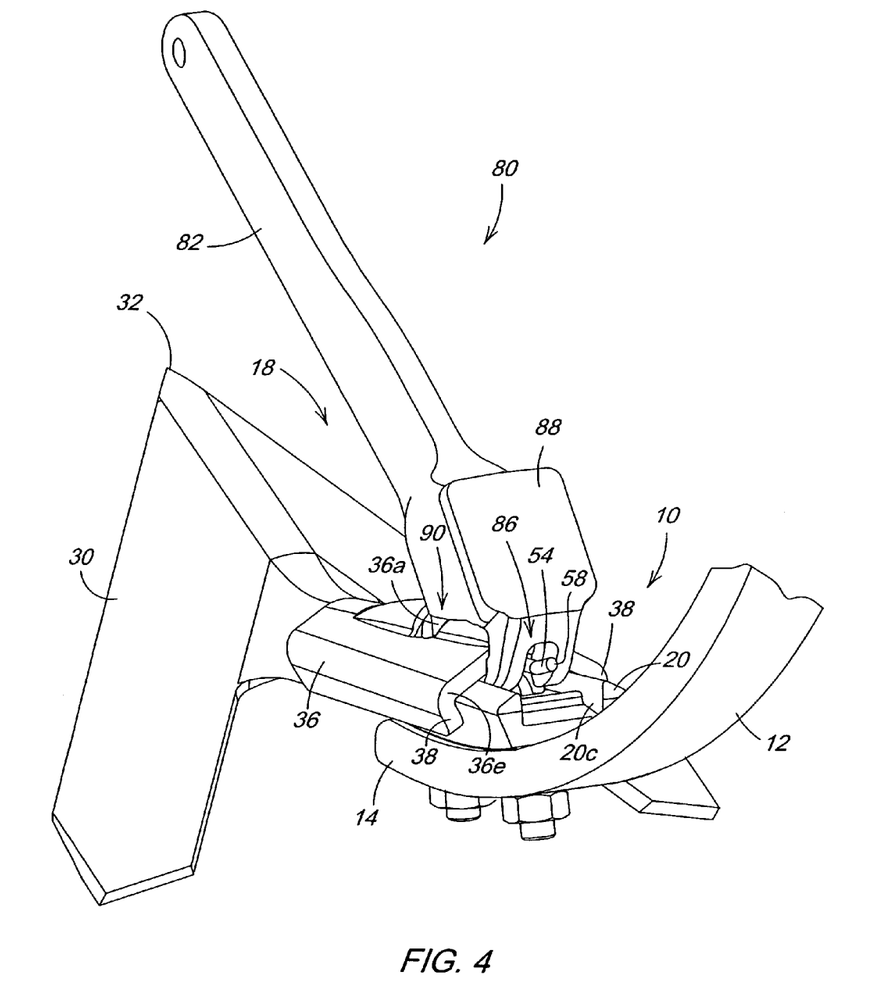
FIG. 4 is a perspective view similar to that of FIG. 3 but showing the sweep partially removed.

Referring now to FIGS. 2–4, therein is shown the lower portion of a spring trip shank assembly 10 including a shank 12 having a lower tool-mounting end 14 supporting a knock-on sweep assembly 18. The assembly 18 includes a wedge-shaped adapter bracket or sweep support 20 having an aft face conforming to the forward face of the end 14. The support 20 is secured to the end 14 by two plow bolts 22 (FIG. 2). An earthworking tool 30, shown as a sweep in FIGS. 2–4, includes a forwardmost tip or point 32 and opposed wing portions 34 diverging outwardly in the rearward direction. An downwardly and rearwardly concave sweep mounting portion or stem 36 includes an aperture 36a and edges 38 which wrap partially around the bracket 20. The portion 36 provides a wedge fit between the tool 30 and the lower end 14 of the shank 12 when the tool 30 is in the final mounted position. Although a cultivator sweep is shown, the tool 30 can be any type of replaceable earth-working tool for various types of implements.

Sweep retaining structure 40 (FIG. 2) is described in the aforementioned application Ser. No. 268,581 and includes an elongated stepped or notched contact area 50 located on the underside of the sweep at the upper portion of the stem or attaching portion 36. A retainer 54 is carried by the sweep support 20 and includes a contact end 58 which is offset forwardly and above the top or forward surface of the sweep support 20. The contact end 58 is biased towards the underside of the stem 36. The end 58 abuts or lies closely adjacent one of a plurality of spaced, flat contact areas of the contact area 50. The end assumes a loss prevention position when the sweep 30 is in the mounted position or in an initial unwedged attachment position. Depending on tolerances between the stem portion 36 and the support 20 the mounted position will vary. If tolerances are such that the fit is looser, the sweep 30 will move farther up relative to the shank, and a lower area of 50 will receive the end 58 for shank retention. The contact prevents the sweep from moving a substantial distance away from the mounted position until the end 58 is moved toward the sweep support 20 against the bias.

As the sweep 30 is initially slipped onto the support 20 by hand, the retainer 54 is urged downwardly and moves into the area 50 to loosely hold the sweep in an initial non-wedging position on the support 20. When the implement is operated in the soil, the forces acting on the sweep 30 force the sweep into a wedge lock position on the support 20. During this upward movement, as each apex of the stepped area passes the end 58, the retainer 54 springs into the next adjacent recess. The retaining structure described above provides a one-way or ratchet type securing arrangement with multiple retaining positions so that the abutment position is closely adjacent the mounted position and sweep travel relative to the support 20 remains small if the sweep begins moving from the fully mounted wedged position regardless of the tolerances between components. The offset retaining area allows easy initial hand mounting of the sweep and retention of the sweep until the operating forces move the sweep into a wedge locked mounting position.

As shown, the retainer 54 is fabricated from corrosion resistant stanless steel spring wire approximately 0.177 inch in diameter and includes a three-coil wrap area 60 supported near the lower central area of the support 20 within an apertured channel 20c which provides the necessary pressure to seat the spring contact end 58 into one of the steps of the contact area 50. The contact end 58 extends upwardly from the coil spring area to a location above the channel 20c near the upper end of the support.

Figure 1:
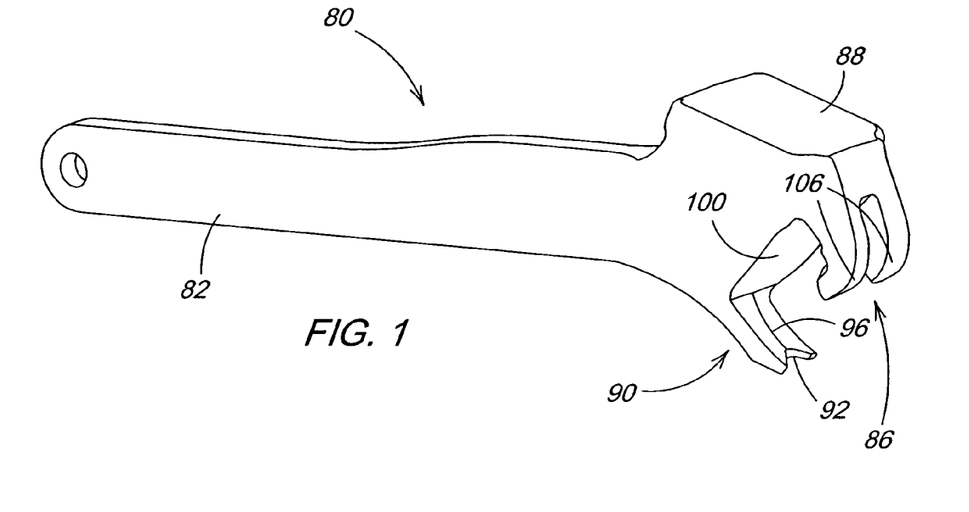
FIG. 1 is a side perspective view of a sweep removal tool.

A sweep removal tool 80 is shown which includes a handle 82 supporting an engaging end 84 with stem edge contacting structure 86 adapted to position the tool 80 on an upwardly directed edge 36e of the stem 36. An impact member 88 is located at end 84 for facilitating driving of the engaging end 84 downwardly in a sweep removal direction by a hammer or other impact tool. A retainer-contacting projection or depressor 90 is offset vertically from the edge contacting structure 86 for moving the retainer 54 against spring bias to a release position as the sweep is dislodged. The end of the depressor 90 includes a V-shaped or notched area 92 opening toward the retainer 54. The notched area 92 engages and positions the shank of the projecting end or first portion of the spring wire retainer 54 and prevents unwanted contact between the coil spring or second area 60 of the retainer 54 and the depressor 90 during removal of the sweep. The depressor 90 is slightly curved to facilitate entry into the sweep stem aperture 36a as the tool 80 is pivoted about the edge 36e. A groove 96 provides added clearance when inserting the depressor 90 in the sweep stem hole 36a.

A curved surface 100 extends between the edge contact structure 86 and the depressor 90 to facilitate pivoting of the tool about the edge contact structure 86. The surface 100 is shaped to prevent substantial contact with the stem 36 during pivoting of the tool about the edge 36e to move the retainer 54 from the retaining position (shown in FIG. 2) downwardly to a release position away from the contact area 50. The surface 100 will contact the sweep stem 36 after the end 58 is depressed below the area 50 so that impact forces on the impact member 88 will not be transferred to the retainer 54 and deform or otherwise damage the retainer during sweep removal.

Figures 5, 6:
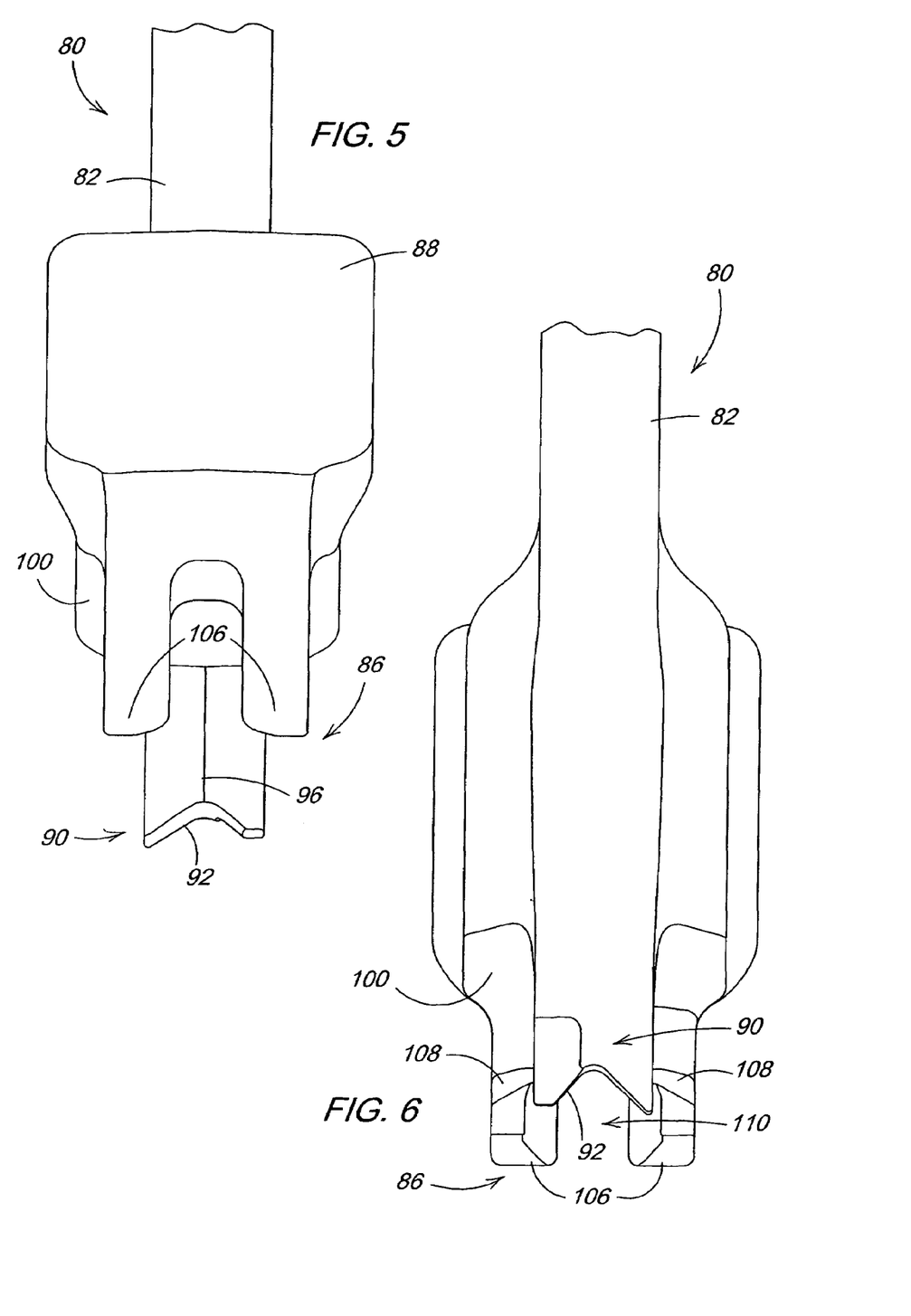
FIG. 5 is an enlarged top perspective view of the sweep-engaging portions of tool of FIG. 1.
FIG. 6 is an enlarged bottom perspective view of the sweep-engaging portions of tool of FIG. 1.
Figure 7:
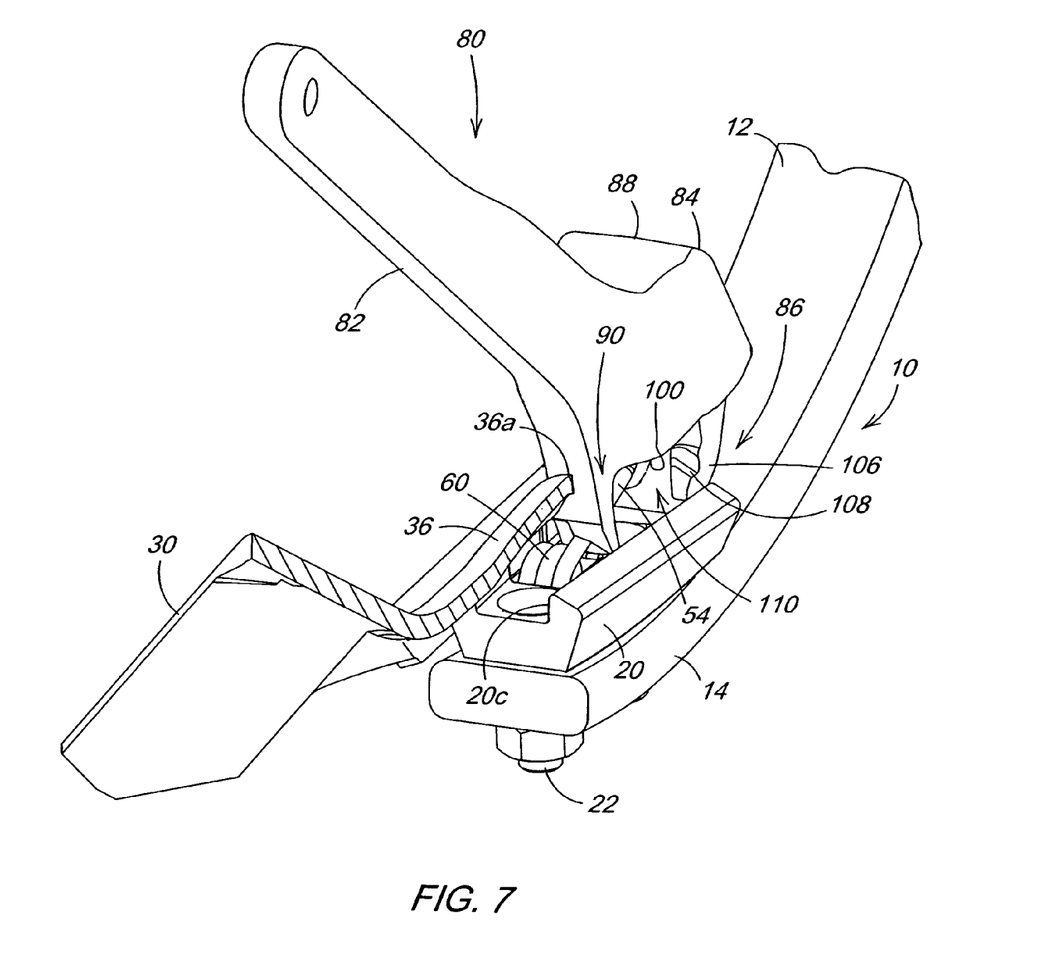
FIG. 7 is an enlarged perspective view of sweep removal tool and sweep assembly of FIG. 2 with portions of the sweep removed to better show the spring retainer and retainer-engaging projection of the tool.

As shown, the edge contacting structure 86 includes transversely spaced ears or claws 106 which engage the top edge 36e of the stem 36 between the sides of the channel 20c. The claws 106 have angled surfaces 108 (see FIG. 6) which conform to the shape of the upper edge 36e of the sweep stem 36 to better locate and stabilize the tool on the sweep. The claw configuration also optimizes surface contact between the claws and the edge so that forces will be distributed uniformly when the member 88 is impacted. The claws 106 define an angled opening at 110 which guides the spring wire retainer 54 between the claws (FIGS. 4 and 7) as the sweep 30 is dislodged and the sweep and tool move in the dislodging direction relative to the retainer 54 to help prevent damaging contact between the tool and the retainer.

To remove the sweep 30, the tool 80 is hooked into the top of the stem edge 35e between the sides of the channel 20c to precisely locate the tool relative to the sweep. The handle 82 is then rotated downwardly about the claw-edge contact points to move the depressor 90 through the access hole 36a to depress the end of the wire retainer 54 below the contact area 50 so the retainer end unseats from the step. A hammer is then used to impact a flat surface 88 or the edge 36e to drive the sweep from the assembly.

Having described the preferred embodiment, it will become apparent that various modifications can be made without departing from the scope of the invention as defined in the accompanying claims.

We claim:

1. A disassembly tool for a knock-on sweep assembly of an implement including a friction mount for securing a sweep in a mounted position on a sweep support, the sweep having an attaching portion with an upper edge, a forward soil engaging portion, a retainer engaging the attaching portion and having a locking position to prevent the sweep from dislodging from the sweep support, the retainer movable from the locking position to a release position for removing the sweep, the disassembly tool comprising:
    a handle having an engaging end, the engaging end including a downwardly directed contact surfaces for engaging the upper edge;
    an impact receiving member for facilitating driving of the contact surfaces in a sweep removal direction to dislodge the sweep from the friction mount;
    a retainer contacting projection offset vertically from the downwardly directed contact surfaces for moving the retainer to the release position as the sweep is dislodged;
    wherein the retainer contacting projection includes a retainer guide portion for positioning the retainer relative to the ears and preventing damage to the retainer as the sweep is dislodged; and
    wherein the retainer guide portion includes a V-shaped groove opening toward the retainer.

2. A disassembly tool for a knock-on sweep assembly of an implement including a friction mount for securing a sweep in a mounted position on a sweep support, the sweep having an attaching portion with an upper edge, a forward soil engaging portion, a retainer engaging the attaching portion and having a locking position to prevent the sweep from dislodging from the sweep support, the retainer movable from the locking position to a release position for removing the sweep, the disassembly tool comprising:
    a handle having an engaging end, the engaging end including a downwardly directed contact surfaces for engaging the upper edge;
    an impact receiving member for facilitating driving of the contact surfaces in a sweep removal direction to dislodge the sweep from the friction mount;
    a retainer contacting projection offset vertically from the downwardly directed contact surfaces for moving the retainer to the release position as the sweep is dislodged;
    wherein the retainer contacting projection includes a retainer guide portion for positioning the retainer relative to the ears and preventing damage to the retainer as the sweep is dislodged; and
    wherein the engaging end includes a surface contacting the sweep as the retainer is moved into the release position to prevent damage of the retainer by impact forces during dislodging of the sweep.

3. A disassembly tool for a knock-on sweep assembly of an implement including a friction mount for securing a sweep in a mounted position on a sweep support, the sweep having an attaching portion with an upper edge, a forward soil engaging portion, a retainer engaging the attaching portion and having a locking position to prevent the sweep from dislodging from the sweep support, the retainer movable from the locking position to a release position for removing the sweep, the disassembly tool comprising:
    a handle having an engaging end, the engaging end including a downwardly directed contact surfaces for engaging the upper edge;
    an impact receiving member for facilitating driving of the contact surfaces in a sweep removal direction to dislodge the sweep from the friction mount;
    a retainer contacting projection offset vertically from the downwardly directed contact surfaces for moving the retainer to the release position as the sweep is dislodged;
    wherein the retainer contacting projection includes a retainer guide portion for positioning the retainer relative to the ears and preventing damage to the retainer as the sweep is dislodged; and
    wherein the contact surfaces comprise tool centering members for positively aligning the projection with the retainer.

4. The tool as set forth in claim 3 wherein the tool centering members include spaced projections having aligning surfaces.

5. The tool as set forth in claim 4 wherein the aligning surfaces define an angled opening for guiding the retainer between the spaced projections during removal of the sweep.

6. A disassembly tool for a knock-on sweep assembly of an implement including a wedge mount for securing a sweep in a wedged position on a sweep support, the sweep having an attaching portion with an upper edge, a forward soil engaging portion, a retainer engaging the attaching portion and having a locking position to prevent the sweep from dislodging from the sweep support, the retainer movable from the locking position to a release position for removing the sweep, the disassembly tool comprising:
    a handle having an engaging end including means for engaging spaced locations on the upper edge;
    means for driving of the ears in a sweep removal direction to dislodge the sweep from the wedge mount, the means for driving including an impact receiving member;
    means for moving the retainer to the release position as the sweep is dislodged, the means for moving including a retainer contacting projection offset vertically from the ears; and
    means for providing increased surface contact between the ears and the upper edge, the means for providing increased surface comprising spaced ears having angled surfaces conforming to the upper edge.

7. The tool as set forth in claim 6 wherein the angled surfaces define an angled opening for guiding the retainer between the spaced ears during removal of the sweep.

8. A disassembly tool for a knock-on sweep assembly of an implement including a wedge mount for securing a sweep in a wedged position on a sweep support independently of sweep mounting bolts, the sweep having an attaching portion with an upper edge, a forward soil engaging portion, a retainer engaging the attaching portion and having a locking position to prevent the sweep from dislodging from the sweep support, the retainer movable from the locking position to a release position for removing the sweep, the disassembly tool comprising:

a handle having an engaging end, the engaging end including spaced ears with downwardly directed contact surfaces for engaging spaced locations on the upper edge;

an impact receiving member for driving of the ears in a sweep removal direction to dislodge the sweep from the wedge mount;

a retainer contacting projection offset vertically from the ears for moving the retainer to the release position as the sweep is dislodged; and wherein the projection includes means for engaging a first portion of the retainer and preventing contact between a second portion of the retainer and the projection during removal of the sweep.

9. The tool as set forth in claim 8 wherein the means for engaging includes a V-shaped groove for receiving the first portion of the retainer.

10. A disassembly tool for a knock-on sweep assembly of an implement including a wedge mount for securing a sweep in a wedged position on a sweep support independently of sweep mounting bolts, the sweep having an attaching portion with an upper edge, a forward soil engaging portion, a retainer engaging the attaching portion and having a locking position to prevent the sweep from dislodging from the sweep support, the retainer movable from the locking position to a release position for removing the sweep, the disassembly tool comprising:

a handle having an engaging end, the engaging end including spaced ears with downwardly directed contact surfaces for engaging spaced locations on the upper edge;

an impact member for driving of the ears in a sweep removal direction to dislodge the sweep from the wedge mount;

a retainer contacting projection offset vertically from the ears for moving the retainer to the release position as the sweep is dislodged;

wherein the projection includes a notched area for engaging a first portion of the retainer and preventing contact between a second portion of the retainer and the projection during removal of the sweep; and including a curved surface extending between the edge contacts and the projection to facilitate pivoting of the tool about the ears without contact between the attaching portion and the curved surface during moving of the retainer to the release position.

11. A disassembly tool for a knock-on sweep assembly of an implement including a wedge mount for securing a sweep in a wedged position on a sweep support independently of sweep mounting bolts, the sweep having an attaching portion with an upper edge, a forward soil engaging portion, a retainer engaging the attaching portion and having a locking position to prevent the sweep from dislodging from the sweep support, the retainer movable from the locking position to a release position for removing the sweep, the disassembly tool comprising:

a handle having an engaging end, the engaging end including spaced ears with downwardly directed contact surfaces for engaging spaced locations on the upper edge;

an impact member for driving of the ears in a sweep removal direction to dislodge the sweep from the wedge mount;

a retainer contacting projection offset vertically from the ears for moving the retainer to the release position as the sweep is dislodged;

wherein the projection includes a notched area for engaging a first portion of the retainer and preventing contact between a second portion of the retainer and the projection during removal of the sweep; and including a sweep contacting area for preventing damaging movement of the retainer from the release position as the sweep is dislodged.

12. A disassembly tool for a knock-on sweep assembly of an implement including a mount for securing a sweep in a wedged position on a sweep support independently of sweep mounting bolts, the sweep having an attaching portion with an edge, a forward soil engaging portion, a retainer engaging the attaching portion and having a locking position to prevent the sweep from dislodging from the sweep support, the retainer movable from the locking position to a release position for removing the sweep, the disassembly tool comprising:

an engaging end, the engaging end including an edge contact member for engaging the upper edge;

means for facilitating movement of the edge contact member in a sweep removal direction to dislodge the sweep from the wedge mount including an impact receiving member;

a retainer contacting projection offset from the edge contact member including means for holding the retainer in the release position as the sweep is dislodged;

wherein the engaging end includes a sweep-contacting portion bottoming against the sweep assembly and preventing deformation of the retainer by impact forces as the sweep is dislodged.

13. The tool as set forth in claim 12 wherein the retainer contacting projection includes a retainer guide portion.

14. The tool as set forth in claim 12 including a curved surface extending between the edge contact member and the projection to facilitate pivoting of the tool about the ears without contact between the attaching portion.

15. The tool as set forth in claim 12 wherein the retainer contacting projection includes a spring wire contact end.

16. A disassembly tool for a knock-on sweep assembly of an implement including a mount for securing a sweep in a wedged position on a sweep support independently of sweep mounting bolts, the sweep having an attaching portion with an edge, a forward soil engaging portion, a retainer engaging the attaching portion and having a locking position to prevent the sweep from dislodging from the sweep support, the retainer movable from the locking position to a release position for removing the sweep, the disassembly tool comprising:

an engaging end, the engaging end including an edge contact member for engaging the upper edge;

an impact receiving member for facilitating movement of the edge contact member in a sweep removal direction to dislodge the sweep from the wedge mount;

a retainer contacting projection offset from the edge contact member for holding the retainer in the release position as the sweep is dislodged;

wherein the engaging end includes a sweep-contacting portion bottoming against the sweep assembly and preventing deformation of the retainer by impact forces as the sweep is dislodged; and wherein the spring wire contact end includes a guide member for guiding the retainer relative to the edge contact member during dislodging of the sweep.

17. The tool as set forth in claim 12 wherein the edge contact member comprises first and second projections with angled surfaces, the angled surfaces aligning the projection with the retainer.

18. The tool as set forth in claim 17 wherein the projection includes an end adapted for insertion in an opening in the sweep adjacent the retainer, the angled surfaces aligning the end with the opening.

19. The tool as set forth in claim 12 wherein the retainer contacting projection includes a groove providing clearance between the tool and the sweep assembly when the projection is holding the retainer in the release position.

* * * * *